United States Patent
Greenberg

(10) Patent No.: US 12,216,209 B2
(45) Date of Patent: Feb. 4, 2025

(54) VIDEO-TRACKING OF SPARSE GEIGER-MODE DATA

(71) Applicant: Raytheon Company, Arlington, VA (US)

(72) Inventor: Adam Hodge Greenberg, Los Angeles, CA (US)

(73) Assignee: Raytheon Company, Arlington, VA (US)

(*) Notice: Subject to any disclaimer, the term of this patent is extended or adjusted under 35 U.S.C. 154(b) by 983 days.

(21) Appl. No.: 17/138,365

(22) Filed: Dec. 30, 2020

(65) Prior Publication Data

US 2024/0402340 A1 Dec. 5, 2024

(51) Int. Cl.
*G01S 17/89* (2020.01)
*G01S 17/42* (2006.01)
*G01S 17/58* (2006.01)
*G01S 17/894* (2020.01)

(52) U.S. Cl.
CPC .............. *G01S 17/89* (2013.01); *G01S 17/42* (2013.01); *G01S 17/58* (2013.01); *G01S 17/894* (2020.01)

(58) Field of Classification Search
CPC .......... G01S 17/89; G01S 17/42; G01S 17/58; G01S 17/894
See application file for complete search history.

(56) References Cited

U.S. PATENT DOCUMENTS

| 10,408,926 | B2 * | 9/2019 | Slobodyanyuk | ........ G01S 17/42 |
| 10,620,315 | B2 | 4/2020 | Zellinger et al. | |
| 10,641,900 | B2 | 5/2020 | Dussan et al. | |
| 10,845,468 | B2 | 11/2020 | Marron | |
| 2009/0279777 | A1 * | 11/2009 | Malfait | ................... H04N 17/00 382/168 |
| 2015/0078449 | A1 * | 3/2015 | Diggins | ................. H04N 19/86 375/240.16 |
| 2016/0371849 | A1 * | 12/2016 | Pavek | ....................... G06T 7/20 |
| 2018/0299556 | A1 | 10/2018 | Marcus et al. | |
| 2019/0068884 | A1 * | 2/2019 | Purkait | ................ H04N 25/531 |
| 2020/0371240 | A1 | 11/2020 | Newman et al. | |
| 2021/0231805 | A1 * | 7/2021 | Dehlinger | ............. G01S 7/4863 |

* cited by examiner

*Primary Examiner* — Isam A Alsomiri
*Assistant Examiner* — Joseph C Fritchman
(74) *Attorney, Agent, or Firm* — Schwegman Lundberg & Woessner, P.A.

(57) ABSTRACT

An apparatus, and method of operating the same locates and tracks a target in four dimensions across a FPA using GMAPD data. The apparatus includes a receiver and a processor arranged to generate a video filter array, the video filter array including a set of estimated velocity pixel coordinate components arranged in a linear data set. The processor generates detected photo events based on received scattered laser pulses, filters the detected photo events by linearly indexing each of the plurality of detected photo events based on, for each detected photo event, a vertical position in the focal plane array, a horizontal position in the focal plane array, a frame number, and the dimensions of the focal-plane array. The processor maps each detected photo event to the set of estimated velocity pixel coordinate components, and generates a motion-compensated image associated with the mapped detected photo events in a filtered two-dimensional array.

20 Claims, 8 Drawing Sheets

| 1 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 1 | 1 | 1 | 1 | 1 | 1 | 1 |
| 3 | 3 | 3 | 3 | 3 | 3 | 3 | 3 | 3 | 1 | 1 | 1 | 1 | 1 | 1 | 1 |
| 4 | 4 | 4 | 4 | 4 | 4 | 4 | 4 | 4 | 1 | 1 | 1 | 1 | 1 | 1 | 1 |

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 75082 | 11 | 11 | 10 | 10 | 10 | 9 | 9 | 12 | 12 | 11 | 11 | 11 | 10 | 10 | 74 |
| 75083 | 12 | 12 | 11 | 11 | 11 | 10 | 10 | 12 | 12 | 11 | 11 | 11 | 10 | 10 | 74 |
| 75084 | 13 | 13 | 12 | 12 | 12 | 11 | 11 | 12 | 12 | 11 | 11 | 11 | 10 | 10 | 74 |
| 75085 | 14 | 14 | 13 | 13 | 13 | 12 | 12 | 12 | 12 | 11 | 11 | 11 | 10 | 10 | 74 |

602

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1023997 | 0 | 0 | 0 | 29 | 24 | 20 | 16 | 0 | 0 | 0 | 32 | 27 | 23 | 19 | 1000 |
| 1023998 | 0 | 0 | 0 | 30 | 25 | 21 | 17 | 0 | 0 | 0 | 32 | 27 | 23 | 19 | 1000 |
| 1023999 | 0 | 0 | 0 | 21 | 26 | 22 | 18 | 0 | 0 | 0 | 32 | 27 | 23 | 19 | 1000 |
| 1024000 | 0 | 0 | 0 | 32 | 27 | 23 | 19 | 0 | 0 | 0 | 32 | 27 | 23 | 19 | 1000 |

VIDEO-TRACKING OF SPARSE GEIGER-MODE DATA

TECHNICAL FIELD

The subject disclosure relates to laser radar systems and, more particularly to processing sparse Geiger-mode data.

BACKGROUND

Laser Detection and Ranging (LADAR), also referred to as LIDAR or LiDAR, is a laser-based radar technology used to capture high-resolution imaging information and to measure distances by illuminating a target object or terrain with laser light. LADAR has been used to create high resolution survey maps of geographic areas and detailed 3-D images of objects. More recently, LADAR has been implemented to support control and navigation of autonomous cars. LADAR uses ultraviolet, visible, or near infrared light to image objects or terrains. Using a narrow laser beam, a LADAR system can detect physical features of objects with extremely high resolutions.

A rigid target moving with a constant 3-D velocity has a fixed relationship with its component range, range rate, azimuth, azimuth rate, elevation, and elevation rate. In order to find where the rigid target is, a LADAR system must detect and determine a common value for each of the target's range, range rate, azimuth, azimuth rate, elevation, and elevation rate for all of the points comprising the target. Existing video-tracking includes processing frames of targets having these component dimensions where the frames have large numbers of pixels, a small number of frames, and a high dynamic range, thus increasing processing time.

SUMMARY OF THE TECHNOLOGY

The application describes exemplary video-tracking and motion compensation systems and methods for simultaneously locating a target in range and range-rate using, for example, sparse Geiger-Mode Avalanche Photodiode (GMAPD) data. Realistic target motion typically includes cross-range motion (across the x and y dimensions of a focal plane array (FPA)) that is currently not accounted for in existing systems. A Sparse Video Tracker (SVT) may be implemented for performing 4D tracking (x, y, ẋ, ẏ) across the FPA. This detection technique may utilize the sparse & binary nature of GMAPD and/or Geiger-mode video data so that processing time is only a function of the number of collected photo-events.

A pre-defined video filter array (VFA) offers a detection technique operating with pre-computed velocity corrections while also using only elements of the original video data that contain photo-events. Therefore, non-detected elements of that space are ignored, and velocity corrections are stored in the VFA ahead of time, both significantly reducing runtime processing and/or delays in detecting targets. Furthermore, by using an accumulator to perform velocity compensation in some implementations, the only operations that this technique uses are memory indexing and integer addition. These detection techniques allow SVT systems and/or methods as described herein to operate quickly over hundreds or thousands of frames of data, which translates to extremely precise measurements of transverse velocity from GMAPD samples.

An example detection and ranging system includes a receiver having a focal plane array. The focal plane array may be arranged to receive scattered laser pulses. The detection and ranging system includes a processor. The processor is arranged to generate a video filter array. The video filter array includes a set of estimated velocity pixel coordinate components arranged in a linear data set while representing a plurality of two-dimensional arrays associated with a plurality of frames. The plurality of two-dimensional arrays have dimensions equal to dimensions of the focal plane array of the receiver. The processor is arranged to generate a plurality of detected photo events based on the received scattered laser pulses. The processor is also arranged to filter the plurality of detected photo events by linearly indexing each of the plurality of detected photo events based on, for each detected photo event, a vertical position in the focal plane array, a horizontal position in the focal plane array, a frame number, and the dimensions of the focal-plane array. The processor is also arranged to map each detected photo event to the set of estimated velocity pixel coordinate components based on a time between receiving the scattered laser pulses and the focal-plane array vertical and horizontal positions of each of the detected photo event. The processor is also arranged to generate a motion-compensated image associated with the mapped plurality of detected photo events in a filtered two-dimensional array having dimensions equal to the dimensions of the focal plane array. The example detection and ranging system may include one or more of the following steps, either alone or in combination.

The processor may generate the video filter array before receiving the scattered laser pulses. The processor may generate the filter array before generating the plurality of detected photo events. The processor may be further arranged to associate the received scattered laser pulses with a frame, a time bin, and a pixel. The processor may implement a Sparse Video Tracker (SVT) arranged to perform 4D tracking (x, y, ẋ, ẏ) across the focal plane array of the receiver.

The detection and ranging system may include a laser transmitter arranged to emit laser pulses toward a target, the scattered laser pulses corresponding to the emitted laser pulses.

Each of the plurality of detected photo events may include at most one detection per pixel per frame. A plurality of video data entries associated with the plurality of the detected photo events may be stored in a memory using a sparse binary representation. The plurality of detected photo events may be Geiger-mode Avalanche Photodiode video data events. The video filter array may be stored in a memory.

An example method for detection and ranging includes receiving scattered laser pulses via a receiver including a focal plane array. The method includes generating a video filter array. The video filter array includes a set of estimated velocity pixel coordinate components arranged in a linear data set while representing a plurality of two-dimension arrays associated with a plurality of frames. Each of the plurality of two-dimensional arrays has dimensions equal to dimensions of the focal plane array of the receiver. The method includes generating a plurality of detected photo events based on the received scattered laser pulses. The method includes filtering the plurality of detected photo events by linearly indexing each of the plurality of detected photo events based on, for each detected photo event, a vertical position in the focal plane array, a horizontal position in the focal plane array, a frame number, and the dimensions of the focal-plane array. The method includes mapping each detected photo events to the set of estimated velocity pixel coordinate components based on a time between receiving the scattered laser pulses and the focal-plane array vertical and horizontal positions of each of the detected photo events. The method also includes generating a motion-compensated image associated with the mapped plurality of detected photo events in a filtered two-dimensional array. The filtered two-dimensional array has dimensions equal to the dimensions of the focal plane array. The example method may include one or more of the following steps, either alone or in combination.

The method may include generating the video filter array before receiving scattered laser pulses. The method may include generating the video filter array before generating the plurality of detected photo events. The method may include emitting laser pulses toward a target. The scattered laser pulses may correspond to the emitted laser pulses. The method may include associating the received scattered laser pulses with a frame, time bin, and a pixel. The method may include storing the detected photo events in a memory. The method may include implementing a Sparse Video Tracker (SVT) arranged to perform 4D tracking (x, y, ẋ, ẏ) across the focal plane array of the receiver.

An example sparse video tracking system includes a pre-processor module. The pre-processor module is configured to generate a video filter array. The video filter array includes a set of estimated velocity pixel coordinate components arranged in a linear data set while representing a plurality of two-dimension arrays associated with a plurality of frames. Each of the plurality of two-dimensional arrays has dimensions equal to dimensions of the focal plane array of the receiver. The sparse video tracking system includes a processor module. The processor module is configured to receive scattered laser pulses from a LADAR receiver. The processor module is configured to generate a plurality of detected photo events based on the scattered laser pulses. The processor module is configured to filter the plurality of detected photo events by linearly indexing each of the plurality of detected photo events based on, for each detected photo event, a vertical position in the focal plane array, a horizontal position in the focal plane array, a frame number, and the dimensions of the focal-plane array. The processor module is configured to map each detected photo events to the set of estimated velocity pixel coordinate components based on a time between receiving the scattered laser pulses and the focal-plane array vertical and horizontal positions of each of the detected photo events. The processor module is also configured to generate a motion-compensated image associated with the mapped plurality of detected photo events in a filtered two-dimensional array having dimensions equal to the dimensions of the focal plane array. The example sparse video tracking system may include one or more of the following steps, either alone or in combination.

The pre-processor module may generate the video filter array before the processor module receives the scattered laser pulses. The pre-processor module may generate the filter array before the processor module generates the plurality of detected photo events. While the present disclosure includes exemplary systems and methods directed to an SVT that uses data derived from lasers or active illumination, one of ordinary skill recognizes that Geiger-mode detectors and/or SVTs as described herein may be used in a passive context, not in conjunction with a laser or any form of active illumination.

BRIEF DESCRIPTION OF THE DRAWINGS

FIG. 6 is an exemplary video filter array corresponding to a 32×32 pixel, 1000 frame block of laser detection and ranging system data, with 49 (7×7) total velocity hypotheses.

DETAILED DESCRIPTION

The subject technology addresses deficiencies associated with video-tracking and motion compensation of LADAR data. The application includes exemplary devices, systems, and methods for efficient processing of LADAR data including using a video filter array.

Figure 1:
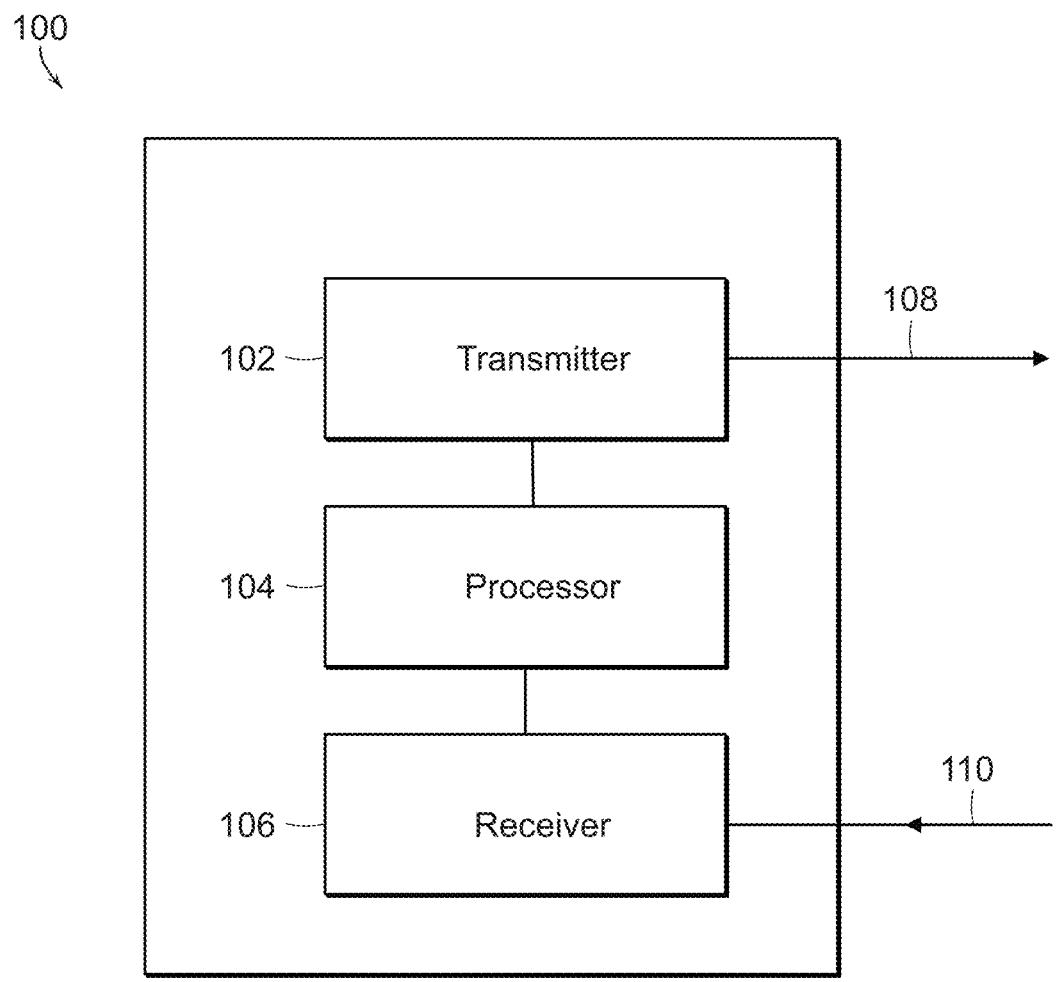
FIG. 1 is a block diagram of an exemplary detection and ranging system.

FIG. 1 is a block diagram of an exemplary LADAR system 100. System 100 includes a laser transmitter 102, a processor 104, and a receiver 106. Laser transmitter 102 is configured to emit laser pulses and/or wavelength-converted pulses 108 while receiver 106 is configured to receive reflected and/or returned laser pulses 110 scattered from a target object and/or terrain. Processor 104 may perform functions such as, without limitation, streaming cross-correlations, artifact corrections, target acquisitions, and tracking and discrimination of targets. Processor 104 may generate image data and/or information for other systems such as an automatic target recognizer (ATR) system or AEGIS combat system and/or network.

Figure 2:
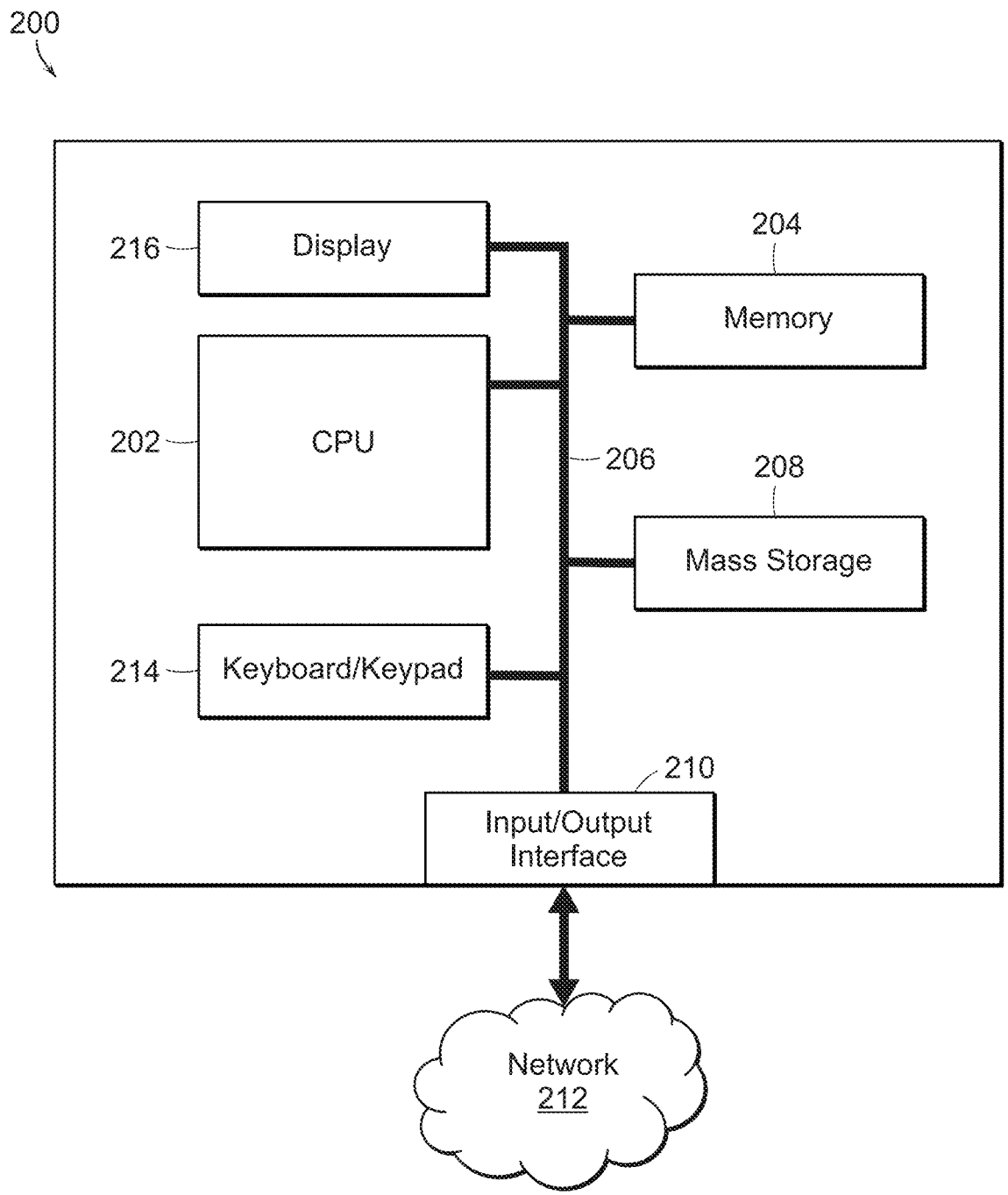
FIG. 2 is a block diagram of a computer system arranged to perform processing associated with a detection and ranging system.

FIG. 2 is block diagram of a computer system 200 arranged to perform processing associated with a LADAR system such as, for example, system 100, 400. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of a LADAR system 100, 400. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include a video filter array such as described with respect to FIGS. 4, 5, 6, 7 and 8.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, and the tracking and discrimination of targets. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with system 100, 400, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 100 or 400 includes a networked-based, e.g., Internet-based, application that may be configured and run on the system 200 and/or any combination of the other components of the system 100 or 400. The computer system 200 may include a web server running a Web 2.0 application or the like. Web applications running on system 100 or 400 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, system 100, 400, and/or 200 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 100, 400, computer system 200, or another component of system 100 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
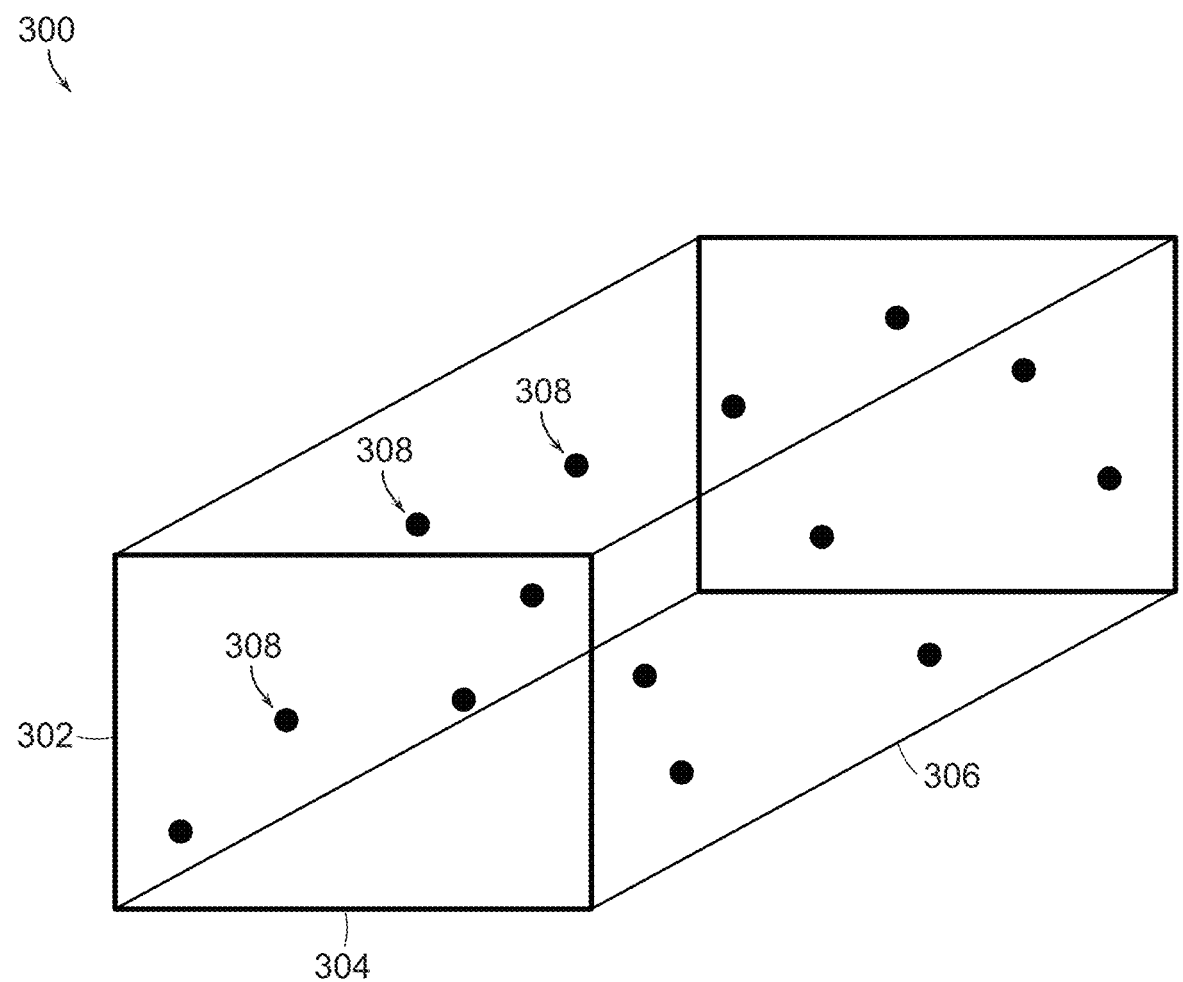
FIG. 3 is an exemplary three-dimensional plot of photo events, as recorded in a GMAPD detector.

FIG. 3 is an exemplary three-dimensional plot of detections or photo events 300 based on video data. Dimensions 302 and 304 represent two orthogonal spatial directions, illustrated as $n_y$ and $n_x$. Dimension 306 represents a time dimension, illustrated as a spatial dimension, $n_{frame}$. In some implementations, the time dimension 306 may represent an objective time of day, or the passage of time between two events, such as the transmission of a laser pulse and the receipt of the scattered laser pulse. Time dimension 306 may also represent a frame time, or specific frame within the video data.

Detections 308, based on video data, are represented herein as singular dots, or pixel locations. A Geiger-mode Avalanche Photodiode (GMAPD) LADAR detects returns from a target, and associates those returns with a frame (slow time), a time bin (fast time), and a pixel (azimuth and elevation). GMAPD LADAR detections 308 include only a single detection per pixel per frame, and therefore, each frame need only store a single detection time associated with each pixel. Furthermore, because there is a maximum of one detection 308 per pixel per frame, if fast-time information is discarded, two-dimension video data can be stored in memory using a sparse binary representation. For example, a list of pixel locations or detections 308 and frame times 306 at which detections 308 occurred.

Figure 4:
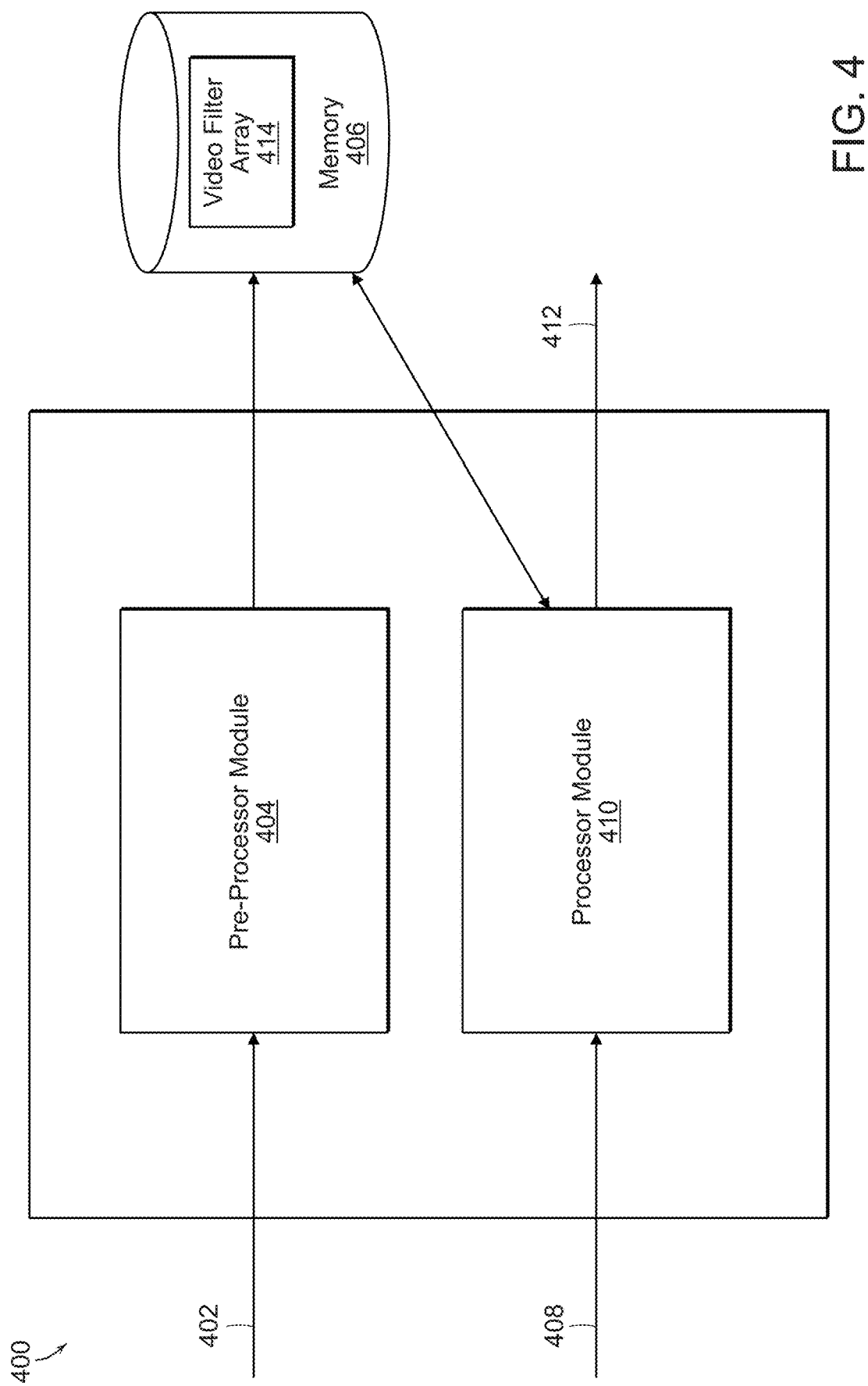
FIG. 4 is a block diagram of a computer system arranged to perform processing associated with laser detection and ranging system data.

FIG. 4 is a block diagram of a sparse video tracking (SVT) system 400 arranged to perform processing associated with laser detection and ranging system data. Video filter array configuration data 402 may be communicated to SVT system 400 to provide operating parameters for a video filter array (VFA) 414 stored within memory 406. Video filter array configuration data 402 may include architecture, data, and expressions of data capable of being transmitted, received or stored operations, enabling the creation and use of video tracking. Pre-processor module 404 may perform certain operations on VFA data 402 such as, without limitation memory look-up, pointer arithmetic, and/or integer addition operations. The video filter array configuration data 402 may include algorithm parameters, a parameter configuration space, and a distribution. The video filter array configuration data 402 is processed by pre-processor module 404 and/or stored in VFA 414.

Pre-processor module 404 may generate and/or configure VFA 414. Pre-processor module 404 may include software routines, functions, and/or hardware components arranged to implement processing functions associated with generating video filter array (VFA) 414. In some implementations, VFA 414 includes an SQL or similar database. In one implementation, processor 104 implements pre-processor module 404 and processor module 410 as software routines or functions. In another implementation, pre-processor module 404 and processor module 410 may be separate units including separate processors.

Processor module 410 may generate photo events based on received scattered laser pulses or video data 408. Processor module 410 may operate on VFA 414 such that video data 408 is input into the VFA 414, such processor module 410 performs sparse video tracking, explained in more detail below, over the course of a LADAR dwell. Processing time of processor module 410 may be a function of the number of photo events or video data 408.

Memory 406 may include a database such as VFA 414. VFA 414 may be stored in memory 406 as a linear table and/or a linear data array. Memory 406 may be integrated within SVT system 400 or located remotely, but in electrical communication with SVT system 400. Memory requirements scale in relation to the following expression:

$$(2\sqrt{M}+1) \cdot S \qquad (1)$$

where S represents the size of the communicated video data 408, and M is the total number of velocity hypotheses, explained in further detail below.

After processor module 410 performs Sparse Video Tracking, an output 414 may be generated, the output including a motion-compensated image corresponding to a correct velocity hypothesis.

Figure 5:
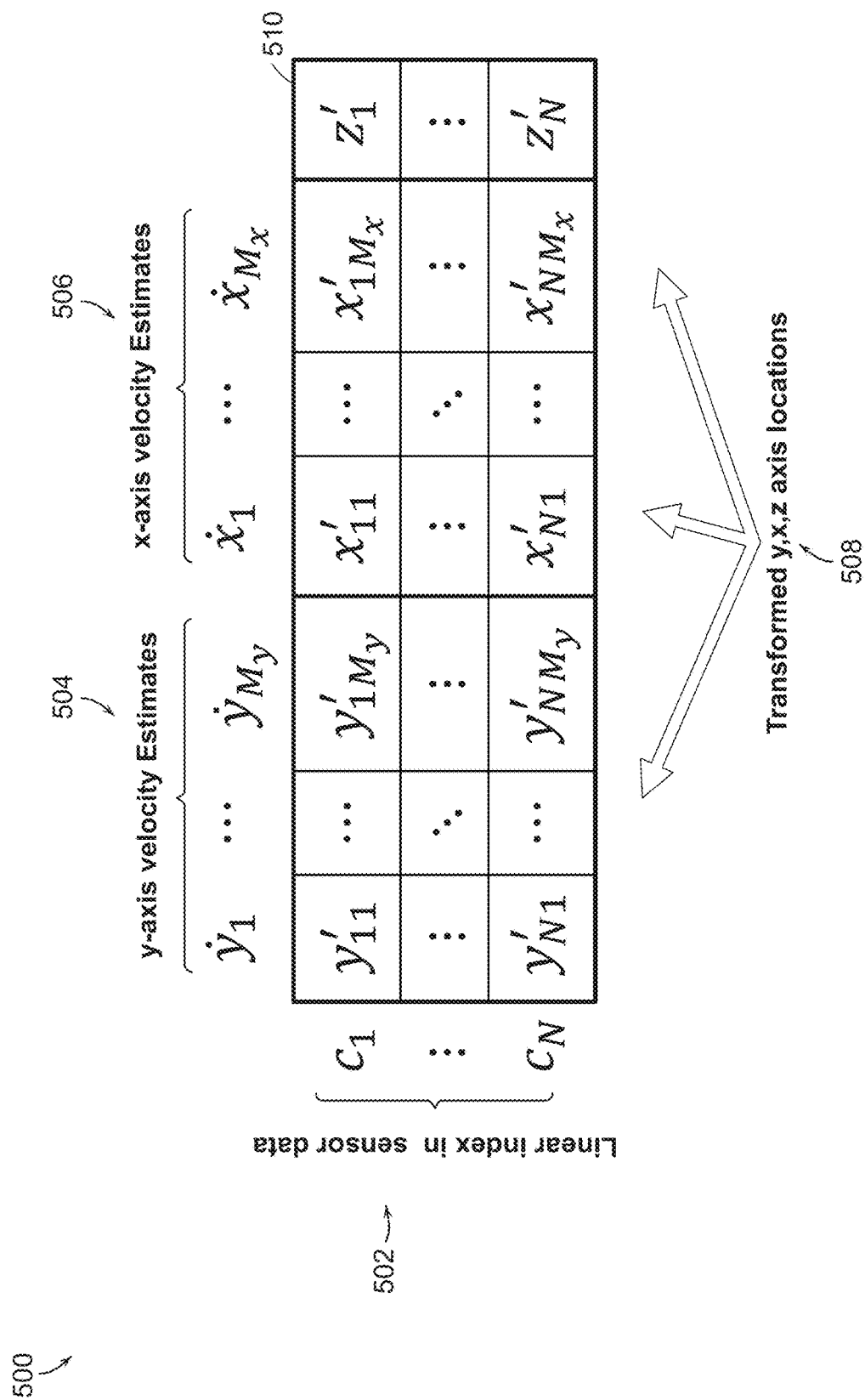
FIG. 5 is an exemplary video filter array showing y-axis velocity hypotheses, x-axis velocity hypotheses, and z-axis frame hypotheses vs. a linear index of raw GMAPD sensor data.

FIG. 5 is a linear data table 500 of VFA 414 in accordance with an implementation of the subject technology, the use of which is referred to herein as sparse video tracking (SVT) arranged to perform 4D tracking (x, y, ẋ, ẏ). Data table 500 shows y-axis velocity hypotheses 504, x-axis velocity hypotheses 506, and a frame 510 vs. a linear index of sensor or video data 502. Data table 500 is representative of a configuration of VFA 414 as generated by pre-processor module 404, and operated on by processor module 410. VFA 414 and/or linear data table 500 may be generated before any scattered LADAR pulses are received by SVT system 400 and/or before input of any video data or photo events. As such, processing and/or generation of VFA 414 may be advantageously completed ahead of a time of input to improve real-time processing speeds. As illustrated by linear data table 500, VFA 414 may enable processing using two efficient CPU 202 operations including memory look-up and integer addition.

The linear index in sensor data 502 corresponds to entries of linear coordinates of video data, referred to as photo events. In some implementations, VFA 414, being arranged according to table 500, enables pre-processor 404 to linearly index video data, including detections 308, based on orthogonal spatial directions dimensions 302 and 304 and time dimension 306.

In an exemplary implementation, a focal plane of a LADAR system has a 32 by 32 pixel dimensional array. Where the focal plane of the LADAR system captures 1000 frames, the total number of coordinates in the video data is 32·32·1000=1,024,000. Table 500 linearly indexes the coordinates such that each row 502 in the table 500 corresponds to a coordinate of the video data, totaling 1,024,000 rows. Table 500 may alternatively linearly index the video data coordinates equating to detections 308 such that each row 502 in the video filter array 500 corresponds to a detection or photo event 308. As such, the video filter array maps a detection event, detection, or photo event stored in video data at a linear index of $c_i$ to a set of possible motion-compensated sensor-data x, y, and z locations, corresponding to vertical focal plane array position, horizontal focal plane array position, and frame number, respectively.

Table 500 may include y-axis velocity estimates 504, x-axis velocity estimates 506, and a frame estimate 510. 504 and 506 include a culmination of decomposed velocity hypotheses that lie along the respective dimension. For example, $\dot{y}_1$ corresponds to the y-axis component of a particular velocity hypothesis and $\dot{x}_1$ corresponds to the x-axis component of a particular velocity hypothesis. $\dot{z}_1$ corresponds to the z-axis component, referring to a frame number. The z-axis component, $\dot{z}_1$, may or may not be included in table 500. VFA processes detections in cross-range position and motion such that the z-axis, a time dimension, may not include a spatial dimension. The z-axis component may be included in the VFA as a z-axis velocity hypothesis including one such hypothesis. The orthogonal axis components of particular velocity hypotheses 504, 506 as well as the frame component 510 represent transformed y, x, or z axis locations 508.

In an exemplary implementation, $\dot{y}_1$ may correspond to −3 meters/second, $\dot{x}_1$ may correspond to 3 meters/second.

In terms of transformed y, x, z locations 508, if a photo event was recorded at $c_1$ in the video data and if the true y-axis velocity of the target represented in the video data was $\dot{y}_1$, then the velocity corrected y-axis location for that photo event would is location $y'_{11}$. Velocity correction is accounting for the fact that a target represented in the video data may be moving. Photo events may be corrected by altering their location, such as by placing the photo events in a reference frame as if all were recorded at the same point in time. All photo events are spread out in both time and space, connected by a velocity, so if the time between photo events is known, and the velocity is hypothesized herein in table 500, a corrected spatial location can be deduced by processor 410.

$x'_{11}$ corresponds to a recorded photo event at the location corresponding to $c_1$ in the video data, where if the true x-axis velocity of the target represented in the video data has a x-axis component of $\dot{x}_1$, then the velocity corrected x-axis component for that photo event would have been location $x'_{11}$. Similarly, $z'_{11}$ corresponds to a recorded photo event at the location corresponding to $c_1$ in the video data, where if the true z-axis frame of the target represented in the video data has a z-axis component of $\dot{z}_1$, then the corrected z-axis component for that photo event would have been location $z'_{11}$. $\dot{z}_1$ may include a single hypothesis.

Therefore, if the true velocity of a target represented in video data has a y-axis component of $\dot{y}_1$, an x-axis component of $\dot{x}_1$, and a z-axis component of $\dot{z}_1$, then a photo event recorded in location $c_1$ of the video data would have a velocity-corrected x, y location in the video data of $x'_{11}$, $y'_{11}$, and a frame location in the video data of $z'_{11}$.

It follows that for the velocity hypothesis $\dot{x}_1$ of 3 meters/second, $\dot{y}_1$ of −3 meters/second, and $\dot{z}_1$ of 0 frames/second, the corrected location for a photo event $c_1$ is the location 3 meters/second, frame 100 corresponding to $x'_{11}$, $y'_{11}$, $z'_{11}$.

For a linear index of sensor or video data 502, table 500 and/or VFA 414 may have a set of y-axis velocity estimates 504, such as $\dot{y}_1$ to $\dot{y}_{M_y}$, a set of x-axis velocity estimates 506, such as $\dot{x}_1$ to $\dot{x}_{M_x}$, and a set of z-axis frame estimates 510, such as $\dot{z}_1$ to $\dot{z}_{M_z}$. Because the y-axis velocity estimates 504 and x-axis velocity estimates 506 are orthogonal one another, corresponding to a z-axis frame estimate, a three-dimension velocity hypothesis can be constructed such that $\dot{y}_i$, $\dot{x}_j$, $\dot{z}_k$ may pair. As such, the number of velocity hypotheses that exists corresponds to $M_y \cdot M_x \cdot M_z$ where $M_y$ is the number of y-axis hypotheses, $M_x$ is the number of x-axis hypotheses, and $M_z$ is the number of z-axis hypotheses.

FIG. 6 is an exemplary linear VFA data table 600 corresponding to a 32×32 pixel, 1000 frame block of laser detection and ranging system video data. The exemplary table 600 includes 1,024,000 individual photo events 602 stored in video data at a linear index. Where the focal plane of the LADAR system captures 1000 frames, the total number of coordinates in the video data, or photo events 602 which are linearly indexed here, is 32·32·1000=1,024,000. The exemplary table 600 also includes 49 total velocity hypotheses 604, 7 y-axis velocities and 7 x-axis velocities.

For example, if the video data captured from the 32×32 pixel array has a detection at focal plane position (5, 12) during frame 145 of 1000, then this photo event would correspond to a linear index of 147,813 because frames 1 through 144 total 147,456 linear index entries (32·32·144=147,456), and position (5, 12) is entry 355 on a 32 by 32 pixel array, corresponding to an additional linear index entries of 355 on the 145$^{th}$ frame. Therefore ((32 columns·32 rows·144 frames)+(32 columns·11 rows)+5 pixels)=147,813

Row 147,813 and column 1 of table 600 corresponds to the x, y coordinates that the detection event would correspond to, under the hypothesis that the target was moving with an x and y-axis velocity of $x'_{11}$, $y'_{11}$. If the VFA 414 included 7 y-axis velocities and 7 x-axis velocities, table 600 would include 49 columns corresponding to the total possible combinations of each pairing.

Figure 7:
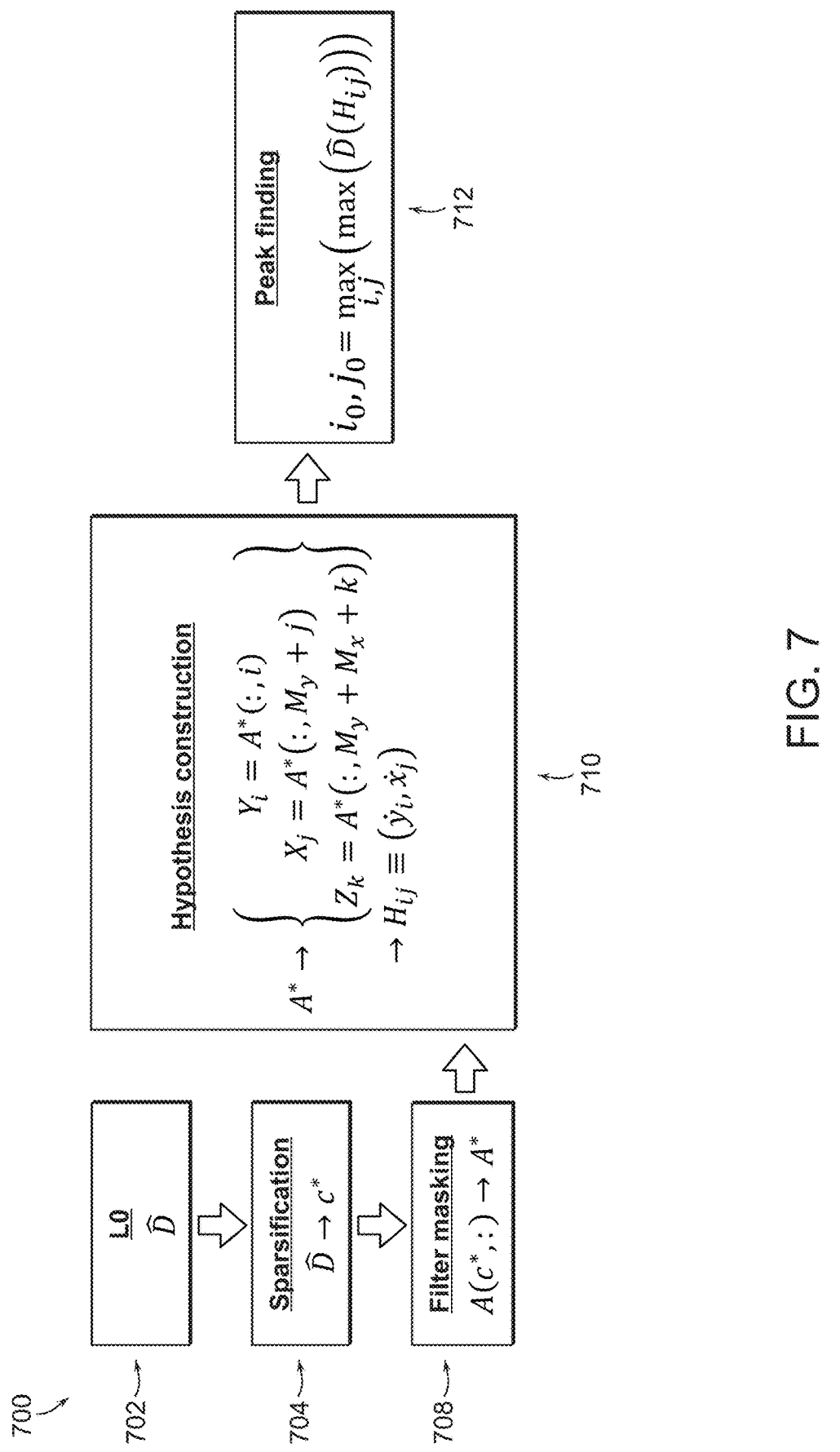
FIG. 7 is a block-flow diagram of how an exemplary video filter array may be used in conjunction with photo events based on received scattered laser pulses.

FIG. 7 is a block-flow diagram of a process 700 of how an exemplary SVT system such as system 400 and video filter array such as VFA 414 may be used to detect targets by processing photo events based on video data. Once a particular video filter array, A for example, such as VFA 414, has been generated according to the above explanation (Step 710), A can be used in conjunction with video data, such as sparse Geiger-mode video data, in a computationally efficient way.

First, among all of the video data, D for example, are received with corresponding focal plane array image $\hat{D}$ (Step 702) such that detections or photo events are extracted as a sparse set, such that linear index 502 containing $c_N$ entries of video data is narrowed to video data containing detections 308 (Step 704). This sparse set, corresponding to the linear indices of the video data at which a detection occurred is referred to herein as c*.

Table 500 is masked or filtered by, for example, processor 410, to just the rows 502 corresponding to the detection events in D. Masking and filtering may make video data sparse because as a result, future steps of an exemplary SVT system may include runtimes that are a function of the number of detection events in D, referred to herein as A*. An exemplary SVT system may include runtimes that are not a function of D. Table 500 and/or VFA 414 may dispose of, set aside, or otherwise hide video data not containing a detection 308. Table 500 masked to just the rows corresponding to the detection events A*, may be expressed as A*=A(c*,:) (Step 710).

Within A*, every distinct triple of columns i,j,k from the sets $Y_i = A^*(:,i)$, $X_j = A^*(:,M_y+j)$, and $Z_k = A^*(:,M_y+M_x+k)$ corresponds to the three coordinates (focal plane array y, focal plane array x, and frame z, respectively) that the video data D would map back to with motion compensation, under the velocity hypothesis $H_{ij} = (\dot{y}_i, \dot{x}_j)$.

Therefore, constructing a motion compensated image corresponding to $H_{ij}$ can be done by casting $Y_i$, $X_j$, $Z_k$ into linear coordinates, and then accumulating the coordinates within a two-dimensional array $\hat{D}(H_{ij})$, with dimensions equal to the dimensions of the focal plane array, for example equal to the x and y dimensions of the video data.

Velocity filtering may be performed thereafter by, for example, processor 410, by testing all pre-defined velocity hypotheses, for example all $H_{ij}$ for $i \leq M_y$, $j \leq M_x$, and then determining the triple $i_0$, $j_0$ such that the maximum value in $\hat{D}(H_{i_0 j_0})$ is maximized (Step 712). For example, $$i_0, j_0 = \max_{i,j}(\max(\hat{D}(H_{ij}))).$$

In another example, all $\hat{D}(H_{ij})$ may be additionally convolved with a target-shaped cross-range matched filter, $M_T$, prior to extracting $i_0, j_0$. For example, $$i_0, j_0 = \max_{i,j}(\max(\hat{D}(H_{ij}) * M_T)).$$

This convolutions occurs in the two-dimensional space of $\hat{D}$, and is therefore faster than operating over the full three-dimensional video space of D.

Figure 8:
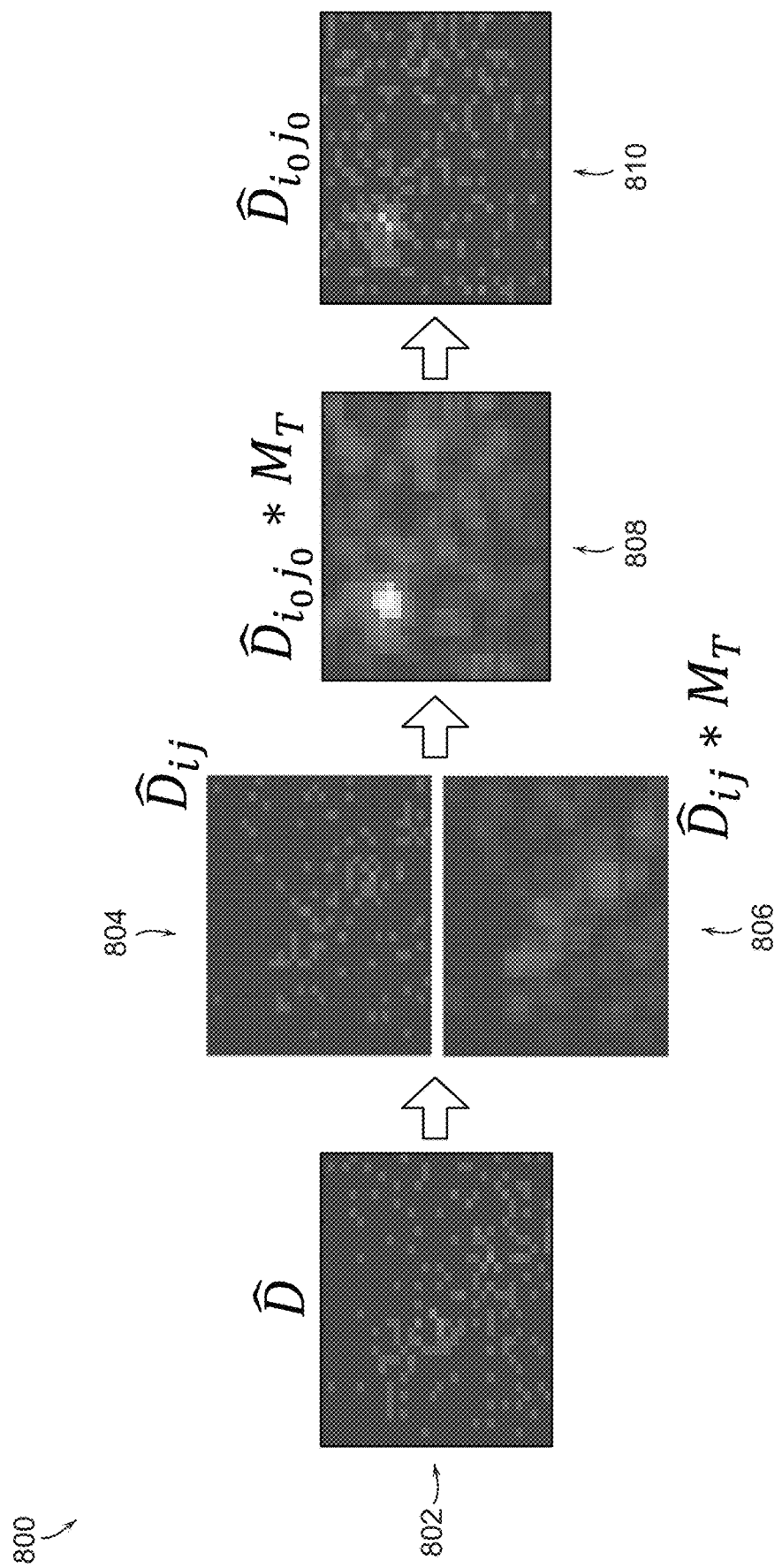
FIG. 8 is an illustrative flow diagram showing exemplary two-dimensional photo events applied to a video filter array, and motion-compensated images generated thereafter based on velocity hypotheses of the video filter array.

FIG. 8 is an illustrative flow diagram 800 showing exemplary two-dimensional photo events applied to a video filter array such as VFA 414, and motion-compensated images generated thereafter based on velocity hypotheses of the video filter array. Video data, having three dimensions, is collapsed along the time dimension, equating to $\hat{D}$. The y-axis of the image 802 containing $\hat{D}$ is the y-axis dimension of the video data. Similarly, the x-axis of the image 802 containing $\hat{D}$ is the x-axis dimension of the video data. A motion-compensated image 804 corresponding to $H_{ij}$ may be constructed by casting $Y_i, X_j, Z_k$ into linear coordinates and accumulating these coordinates within a 2D array. Motion-compensated image 804 may be convolved with a target shaped cross-range matched filter, $M_T$, as shown in convolved motion-compensated image 806. Thereafter, velocity filtering as explained herein may be performed by testing all pre-defined velocity hypotheses, and then determining the $i_0$, $j_0$ such that the maximum value in $\hat{D}_{i_0 j_0}$ is maximized 808. Velocity filtering may also be performed without convolution with a target shaped cross-range matched filter as shown in motion-compensated image 810.

As stated above, the video data is filtered to video data containing detections or photo events, extracted as a sparse set. The sparse set is applied to the video filter array such as VFA 414 explained herein. The resulting corrected locations is used thereafter to construct a new image where the new image corresponding to what the photo events would have looked like had a target in the video data, with the velocity as hypothesized, were instead stationary. This process is iterative, repeated for each velocity as hypothesized. A maximum, corresponding to data in correlation with a hypothesized velocity, can be determined thereafter. The maximum describes the existence of a target, the position of the target in the video data, and the target's actual velocity.

It will be apparent to those of ordinary skill in the art that certain aspects involved in the operation of the system 100, 400, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A detection and ranging system comprising:
   a receiver including a focal plane array arranged to receive scattered laser pulses; and
   a processor arranged to:
      generate a video filter array, the video filter array including a set of estimated velocity pixel coordinate components arranged in a linear data set while representing a plurality of two-dimensional arrays associated with a plurality of frames, each of the plurality of two-dimensional arrays having dimensions equal to dimensions of the focal plane array of the receiver,
      generate a plurality of detected photo events based on the received scattered laser pulses,
      filter the plurality of detected photo events by linearly indexing each of the plurality of detected photo events based on, for each detected photo event, a vertical position in the focal plane array, a horizontal position in the focal plane array, a frame number, and the dimensions of the focal-plane array,
      map each detected photo event to the set of estimated velocity pixel coordinate components based on a time between receiving the scattered laser pulses and the focal-plane array vertical and horizontal positions of each of the detected photo event, and
      generate a motion-compensated image associated with the mapped plurality of detected photo events in a filtered two-dimensional array having dimensions equal to the dimensions of the focal plane array.

2. The detection and ranging system of claim 1, wherein the processor generates the video filter array before receiving the scattered laser pulses.

3. The detection and ranging system of claim 2, wherein the processor generates the filter array before generating the plurality of detected photo events.

4. The detection and ranging system of claim 1 further comprising a laser transmitter arranged to emit laser pulses toward a target, the scattered laser pulses corresponding to the emitted laser pulses.

5. The detection and ranging system of claim 1, wherein the processor is further arranged to associate the received scattered laser pulses with a frame, a time bin, and a pixel.

6. The detection and ranging system of claim 1, wherein each of the plurality of detected photo events includes one detection per pixel per frame.

7. The detection and ranging system of claim 1, wherein a plurality of video data entries associated with the plurality of the detected photo events are stored in a memory using a sparse binary representation.

8. The detection and ranging system of claim 1, wherein the plurality of detected photo events are Geiger-mode Avalanche Photodiode video data events.

9. The detection and ranging system of claim 1, wherein the video filter array is stored in a memory.

10. The detection and ranging system of claim 1, wherein the processor implements a Sparse Video Tracker (SVT) arranged to perform 4D tracking $(x, y, \dot{x}, \dot{y})$ across the focal plane array of the receiver.

11. A method for detection and ranging comprising:
   receiving scattered laser pulses via a receiver including a focal plane array;
   generating a video filter array, the video filter array including a set of estimated velocity pixel coordinate components arranged in a linear data set while representing a plurality of two-dimension arrays associated with a plurality of frames, each of the plurality of two-dimensional arrays having dimensions equal to dimensions of the focal plane array of the receiver;

generating a plurality of detected photo events based on the received scattered laser pulses;

filtering the plurality of detected photo events by linearly indexing each of the plurality of detected photo events based on, for each detected photo event, a vertical position in the focal plane array, a horizontal position in the focal plane array, a frame number, and the dimensions of the focal-plane array;

mapping each detected photo events to the set of estimated velocity pixel coordinate components based on a time between receiving the scattered laser pulses and the focal-plane array vertical and horizontal positions of each of the detected photo events; and generating a motion-compensated image associated with the mapped plurality of detected photo events in a filtered two-dimensional array having dimensions equal to the dimensions of the focal plane array.

12. The method for detection and ranging of claim 11, wherein generating the video filter array occurs before receiving scattered laser pulses.

13. The method for detection and ranging of claim 12, wherein generating the video filter array occurs before generating the plurality of detected photo events.

14. The method for detection and ranging of claim 11 further comprising emitting laser pulses toward a target, the scattered laser pulses corresponding to the emitted laser pulses.

15. The method for detection and ranging of claim 11 further comprising associating the received scattered laser pulses with a frame, time bin, and a pixel.

16. The method for detection and ranging of claim 11 further comprising storing the detected photo events in a memory.

17. The method for detection and ranging of claim 11 further comprising implementing a Sparse Video Tracker (SVT) arranged to perform 4D tracking $(x, y, \dot{x}, \dot{y})$ across the focal plane array of the receiver.

18. A sparse video tracking system comprising:
a pre-processor module configured to:
generate a video filter array, the video filter array including a set of estimated velocity pixel coordinate components arranged in a linear data set while representing a plurality of two-dimension arrays associated with a plurality of frames, each of the plurality of two-dimensional arrays having dimensions equal to dimensions of the focal plane array of the receiver, and a processor module configured to:
receive scattered laser pulses from a LADAR receiver,
generate a plurality of detected photo events based on the scattered laser pulses,
filter the plurality of detected photo events by linearly indexing each of the plurality of detected photo events based on, for each detected photo event, a vertical position in the focal plane array, a horizontal position in the focal plane array, a frame number, and the dimensions of the focal-plane array,
map each detected photo events to the set of estimated velocity pixel coordinate components based on a time between receiving the scattered laser pulses and the focal-plane array vertical and horizontal positions of each of the detected photo events, and
generate a motion-compensated image associated with the mapped plurality of detected photo events in a filtered two-dimensional array having dimensions equal to the dimensions of the focal plane array.

19. The sparse video tracking system of claim 18, wherein pre-processor module generates the video filter array before the processor module receives the scattered laser pulses.

20. The sparse video tracking system of claim 19, wherein the pre-processor module generates the filter array before the processor module generates the plurality of detected photo events.

* * * * *